United States Patent
Verego et al.

(10) Patent No.: US 10,600,059 B2
(45) Date of Patent: Mar. 24, 2020

(54) COMPONENT BASED CUSTOMER CARE MANAGEMENT

(75) Inventors: Greg Verego, Charlotte, NC (US); William Guinn, Placerville, CA (US); Maxine Campbell, Lancaster, SC (US); Michael Axford, Rancho Cordova, CA (US); Kevin Edwards, Indian Trail, NC (US); Craig Hanson, El Grove, CA (US)

(73) Assignees: AMDOCS DEVELOPMENT LIMITED, Limassol (CY); AMDOCS, INC., Chesterfield, MO (US)

( * ) Notice: Subject to any disclaimer, the term of this patent is extended or adjusted under 35 U.S.C. 154(b) by 3193 days.

(21) Appl. No.: 10/902,442

(22) Filed: Jul. 29, 2004

(65) Prior Publication Data

US 2006/0026011 A1   Feb. 2, 2006

(51) Int. Cl.
*G06Q 30/02* (2012.01)
*G06Q 10/06* (2012.01)

(52) U.S. Cl.
CPC ........... *G06Q 30/02* (2013.01); *G06Q 10/063* (2013.01)

(58) Field of Classification Search
USPC .......................................................... 705/1
See application file for complete search history.

(56) References Cited

U.S. PATENT DOCUMENTS

| | | | | |
|---|---|---|---|---|
| 6,067,525 | A  * | 5/2000 | Johnson ................ | G06Q 10/06 705/7.13 |
| 6,304,892 | B1 * | 10/2001 | Bhoj et al. ................... | 709/202 |
| 7,130,807 | B1 * | 10/2006 | Mikurak ............... | G06Q 10/06 705/7.25 |
| 2002/0103899 | A1 * | 8/2002 | Hogan et al. ................ | 709/224 |
| 2002/0188458 | A1 * | 12/2002 | Babbrah .......................... | 705/1 |
| 2003/0083947 | A1 * | 5/2003 | Hoffman ............... | G06Q 10/06 705/22 |
| 2003/0144873 | A1 * | 7/2003 | Keshel ............................ | 705/1 |
| 2003/0229541 | A1 * | 12/2003 | Randall et al. ................ | 705/14 |
| 2003/0233249 | A1 * | 12/2003 | Walsh et al. ..................... | 705/1 |
| 2004/0039679 | A1 * | 2/2004 | Norton ................... | G06Q 40/04 705/37 |
| 2004/0064548 | A1 * | 4/2004 | Adams et al. ............... | 709/224 |
| 2005/0256802 | A1 * | 11/2005 | Ammermann ......... | G06Q 20/02 705/44 |

* cited by examiner

Primary Examiner — Andrew B Whitaker
(74) Attorney, Agent, or Firm — Zilka—Kotab, PC

(57) ABSTRACT

A component-based customer care management provides a flexible, modifiable, and customizable data processing system that may be tailored according to a business' needs. The component-based system may be deployed as a software, hardware, or software and hardware enterprise system. The enterprise system may include discrete federated task-based components that interface with a database of information through a data management or integration components. The enterprise system may be modified or updated with modifications to components to realize changing data processing needs. The enterprise system may be maintained, revised, modified, or updated without substantial or significant recoding.

5 Claims, 8 Drawing Sheets

COMPONENT BASED CUSTOMER CARE MANAGEMENT

BACKGROUND OF THE INVENTION

1. Technical Field

This invention relates to an information processing system, and in particular, to a component-based customer care management system.

2. Related Art

Customer data and information processing is a powerful business tool. Complex calculations may be executed on large volumes of data for many business purposes. Such information processing systems may employ inflexible hard-coded software that may be unsuitable for future needs. Such software may be revised, if at all, through expensive, time-consuming re-programming, or re-keying. Furthermore, the reprogrammed software may further require expensive debugging, additional training and increased or additional technical support.

BRIEF SUMMARY

A customer care management system provides data and information analysis, maintenance, and deployment. An embodiment of the customer care management system, referred to as the enterprise system, provides a component-based, flexible and adaptable customer data processing system. The enterprise system may integrate all, or select integrated portions of, back-office information processing.

The enterprise system may be adapted according to a business' data processing needs and customized for a business' product offering and/or services. The enterprise system may be integrated into heterogeneous environments that interact with other processes, 3rd party systems such as customer relationship management systems, multiple billing systems, and other systems or legacies used by business organizations. The enterprise system may be adapted to future needs without substantial re-programming, re-coding, or re-releases. The enterprise system may be modified by adjustments to business models, structures of changing markets.

In an embodiment, the enterprise system includes federated pre-integrated components that interface other components. The components may include components of the enterprise system and/or other or $3^{rd}$ party applications and systems. The federated components provide platforms for organizing and aligning information and data processed by the business organization according to tasks for the business organization. Each component corresponds to a distributable piece of the enterprise system, and performs data processing functions based on common, related business tasks. The component may include a collection of software, documents, files, and objects for the task for which the component is deployed to perform for the business organization.

The components may interface a database through a data management or enterprise administration component. The enterprise administration component manages a file of records by controlling the storage and/or retrieval of the records. The enterprise administration component directs data to and from the files for various other components in the enterprise system.

The federated components may include a contact management component, a billing calculation component, a customer account financial management component, a customer and contract management component, a electronic provisioning management component, a enterprise administration component, a enterprise financials component, a facilities management component, a fulfillment component, a human resources management component, a inventory management component, a marketing component, a product catalog component, a purchasing, risk and collection management component, a sales agent management component, a sales and order management component, a statement preparation and production component, a supplier management component, a target management component, a tax management component, a workflow, and workforce management component and the like.

Each component may include sub-systems that perform related data processing functions. For example, the customer and contract management component may process and manage data specific to customers and contracts with or for that customer. The customer and contract management component may process and manage data related to customers' addresses, phone numbers and the type of services provide to the customers. The components may be deployed individually or in groups for defined data processing.

In an embodiment, data may be stored in a collection of files that may be organized for quick search and retrieval of data, such as a database. The files may contain fields of data. The database is administered by a data processing component configured to store and retrieve data from the data base and provide the data to various other components. The administration component may store an association of the data and a function for the data. The data may be provided to a function-based component based on the stored association to achieve a desired result from the processed data. For example, a customer's address may be retrieved by the administration component and may be provided to a customer information component. The customer information component may process the address information and provide that information to the billing component. The billing component may use the information to prepare a bill for the customer. The processed information may be stored in a database by the administration component and may be further processed by other components.

The foregoing discussion is provided only by way of introduction. Other systems, methods, apparatuses, features and advantages of the invention will be, or will become, apparent to one with skill in the art upon examination of the following figures and detailed description. It is intended that all such additional systems, methods, apparatuses, features and advantages be included within this description, be within the scope of the invention, and may be realized and obtained by means of the instrumentalities and combinations particularly pointed out in the claims.

BRIEF DESCRIPTION OF THE DRAWINGS

The invention can be better understood with reference to the following drawings and description. Like referenced numerals designate corresponding parts throughout the different views.

DETAILED DESCRIPTION OF THE PREFERRED EMBODIMENT

A component-based customer care management system, also referred to as an enterprise system, provides a flexible, modifiable, and adaptable data and information processing system that provides automated customer care business analysis. The enterprise system includes multiple components, or modules, that provide function, role, or task-specific processing. The components may be adapted and selectively invoked according to data processing requirements of a business organization.

The enterprise system and each of the components may be embodied as computer software including object and/or source code, hardware, or a combination of software and hardware. The enterprise system and its components may be stored on a computer-readable medium installed on, deployed by, resident on, and/or used by one or more computers, servers, gateways, or a network of computers, or any combination thereof. The computers, servers, gateways, may have a controller capable of carrying out instructions embodied in the computer software.

The enterprise system and its components may be implemented using any known software platform or frameworks including Java™ 2 Platform Enterprise Edition (J2EE™), Oracle 9i, Extensible Markup Language (XML)-, application programming interfaces (API) based designs and like component-based software platforms. The J2EE™ application may be used, for example, to implement the enterprise system and to reduce efforts associated with the design, development, assembly, deployment, maintenance and updates for the enterprise system. The J2EE™ platform may be a multi-tiered distributed application having the capability to integrate XML-based data interchange. The enterprise system may deliver data processing solutions with platform-independent API's that are compatible with of other software systems.

Figure 1:
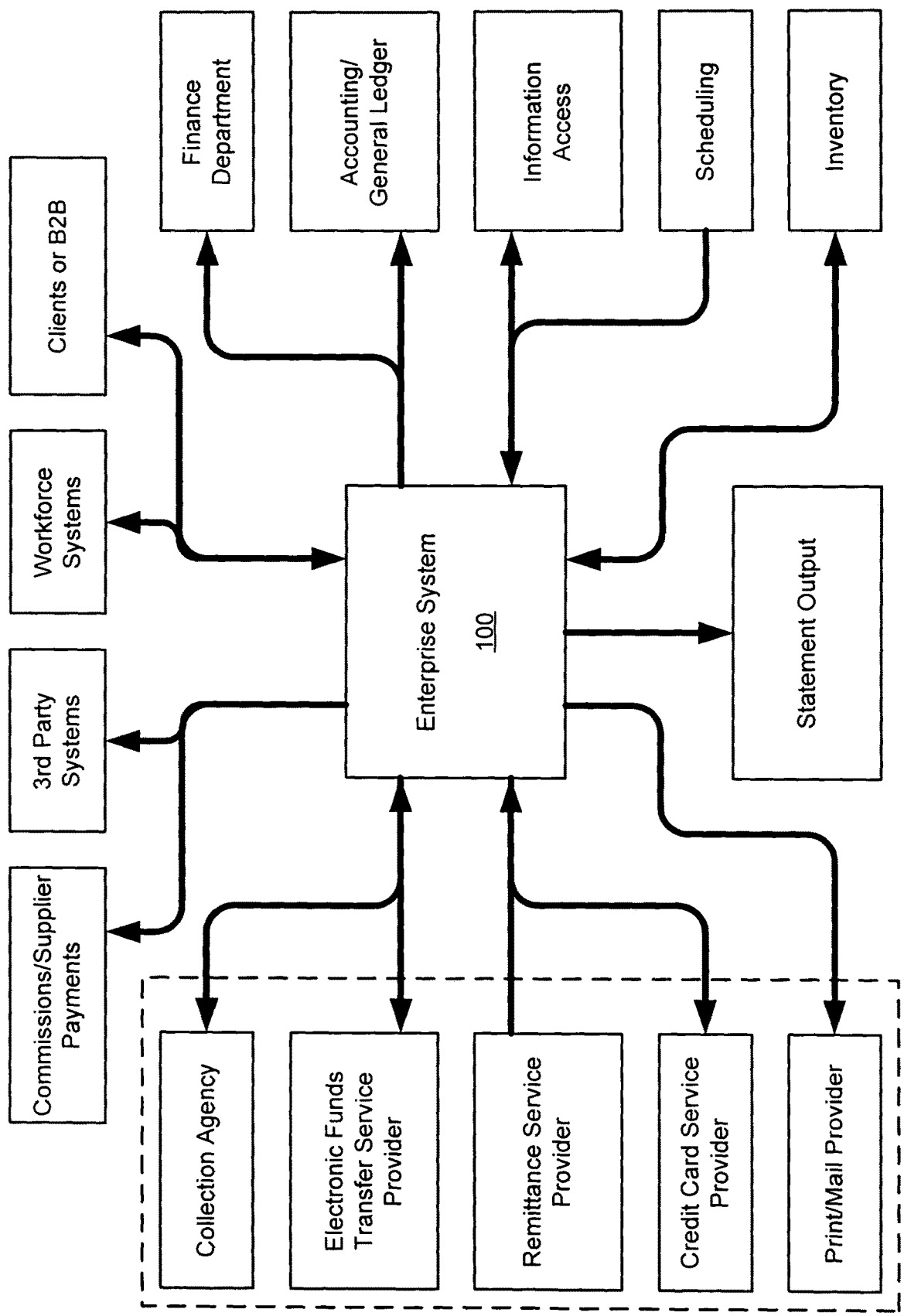
FIG. 1 illustrates a component-based customer care management system.

FIG. 1 illustrates an environment for the enterprise system 100. The enterprise system 100 supports automated data processing operations for a variety of businesses organizations including service providers, manufacturers, retailers, wholesalers, couriers, utilities and the like. Examples of such businesses include cable television providers, direct-to-home television (Satellite), satellite radio, telephony including wireline, wireless and voice over internet telephony, gas utility, electric utility, internet service, home security, peer-to-peer and business-to-business e-commerce, retail goods and service, and the like.

The enterprise system 100 integrates a business' automated data processes. Examples of automated processes include customer care, customer problem resolution, contract administration, account financials, fulfillment, electronic provisioning and fulfillment, addressable unit, event collection and usage mediation, billing, statement production, product pricing, marketing, sales and orders, sales agent management, workforce management, access management, enterprise administration, financials, operations, supplier management, inventory control, facilities management, premise and location management, purchasing, trouble and fraud management, workflow and process management, human resources management, GIS management, settlement management, risk and collections management, and data warehousing.

FIG. 1 illustrates an exemplary enterprise system deployed for business organization such as a direct-to-television, or satellite television, service provider. The enterprise system 100 provides data processing services to internal users such as employees, departments, divisions, contractors, representatives, agents, affiliates, branches, or like associations of the business organization. For example, orders for satellite television service may be placed by a customer and received by an employee such as a sales representative, an agent, a contractor, a franchisee, at a local sales office. Similarly, a local customer sales representative may receive an inquiry from an existing customer. A database of information related to the order or customer inquiry may be queried to retrieve data that may be used to process the order or inquiry. The enterprise system 100 processes the order, calculates or otherwise determines an appropriate commission payment for the local sales representative, and stores data related to the transaction in the database.

The enterprise system 100 also may process data related to an invoice from a supplier and store relevant data in a database. The commission payment and the payment to the supplier are processed and forwarded to the appropriate person or entity by the enterprise system 100.

The enterprise system 100 may interface with other systems of the business organization such as legacies and 3rd party systems. The enterprise system 100 and it components may process and/or store data that is provided to pre-existing data processing systems or legacy systems associated with the business organization. The enterprise system 100, for example, may provide notification of a new service, and awards or incentive program to a remote or local office having a discrete legacy data processing system. The legacy data processing system may receive the data from the enterprise system 100 and further process and store the information.

The enterprise system 100 may process data stored in the database according to financial and accounting requirements. For example, the enterprise system 100 may process data stored in the database to provide financial reporting and forecasting to a financial department, business executives, or board of directors. Ledger entries may be created and used to provide, for example, annual reporting for the business and/or inventory control. A contract administrator may access the enterprise system 100 to track the provisions of various contracts of suppliers for the business organization. A billing clerk may access the enterprise system 100 to input data related to transactions with customers or suppliers of the business organization. The enterprise system 100 may trigger an inventory manager when the data in the database indicates that inventory supplies reach a threshold, such as minimum or critical level.

The enterprise system 100 may provide scheduling of services. For example, the enterprise system may record work orders that need to be fulfilled with a certain time period and availability of a workforce to attend to the work orders for that period. The enterprise may assign the work orders to an individual within the workforce and schedule an allotted time in the individual's calendar. A customer associated with the work order may be notified of a scheduled appointment. In the example of a satellite television provider, the enterprise system 100 receives data regarding weekly or monthly television programming from various broadcasters or networks. The scheduling data may be processed and stored in one or more fields composed as records and filed such as in a database. The select data database may be accessed by, for example, the sales representative or a customer.

The enterprise system 100 also provides services for external users such as vendors, suppliers, regulatory agencies, auditors, and customers. For example, a third-party clearinghouse also may interact with the enterprise system 100 to access data in the database to perform payment validation. The enterprise system 100 may process and store data received from electronic funds transfer service provider and/or remittance service providers. For example, the enterprise system 100 may process a transaction for an electronic payment from a customer for services provided to that customer. The enterprise system may receive notification of a no-sufficient funds return of a bank. The enterprise system 100 also may process and store data provided to an electronic funds transfer service provider. The enterprise system 100 may provide for monthly electronic transfer of funds from an account associated to suppliers for the business organization.

The enterprise system 100 may interact with banks, financial institutions and credit service providers, such as a credit card service. In the example of the satellite television provider, a customer may remit payment using a credit card and the enterprise system communicates with the credit card service provider to process the credit card transaction.

The enterprise system 100 may also provide data to mass mailing services, credit bureaus, marketing agencies, advertising agencies, and printing companies. The enterprise system 100 may query the database to provide appropriate information for a mass mailing. For example, for a new promotion or special event such as a special telecast, the satellite television provider may mail notices to existing and potential customers for the telecast. The enterprise system 100 may query the database for information related to these existing and potential customers and provide that information to a printing and/or mass mailing vendor. The information may be used to generate advertisements or flyers that are sent to the selected existing and/or potential customers.

In order to maintain the integrity of the enterprise system 100 and the data processed by the enterprise system 100, access to the various functions and data processed by the enterprise system is limited or controlled. An administrator or group of administrators, such as an information services department, may have limited authority to control access to the various features and data of the enterprise system 100. The administrator maintains and controls access database of information processed by the enterprise system 100. The administrator may be provided with a password that allows access to maintenance functions of the enterprise system 100. The database may store data related to the access rights of various users of the enterprise system 100. The administrator may be responsible for the day-to-day operation of the enterprise system 100 and overseeing and monitor the overall functionality of the enterprise system 100.

The enterprise system 100 may provide data processing services for customers or clients of the business organization. A customer may access the enterprise system 100 to maintain or review the customer's account, review promotions or listing of goods and/or services provided, order additional goods and/or services, modify existing services, check on the status of an order, or refer additional customers. For example, a customer of the satellite television provider may access the enterprise system 100 from a remote terminal, such as a home computer or PC, to review an offer for an upcoming special telecast and to place an order for the telecast. The customer may also access the enterprise system 100 via an interactive telephone connection where the customer provides responses to voice prompts to check the status of an account, a recent payment, change or update account information, order new services, change existing services, or speak with an operator who may access the enterprise system 100.

Statements and other data processed by the enterprise system 100 may be provided to an output of the enterprise system 100. Annual, monthly, or weekly reports may be provided to a printer and/or mail distribution center within the business organization. Electronic bill presentment and payment may be provided by the enterprise system 100. Billing statements may be centrally or remotely printed and sent to the corresponding customer. Accordingly, the enterprise system 100 may provide a data output for various users of the enterprise system 100.

Figure 2:
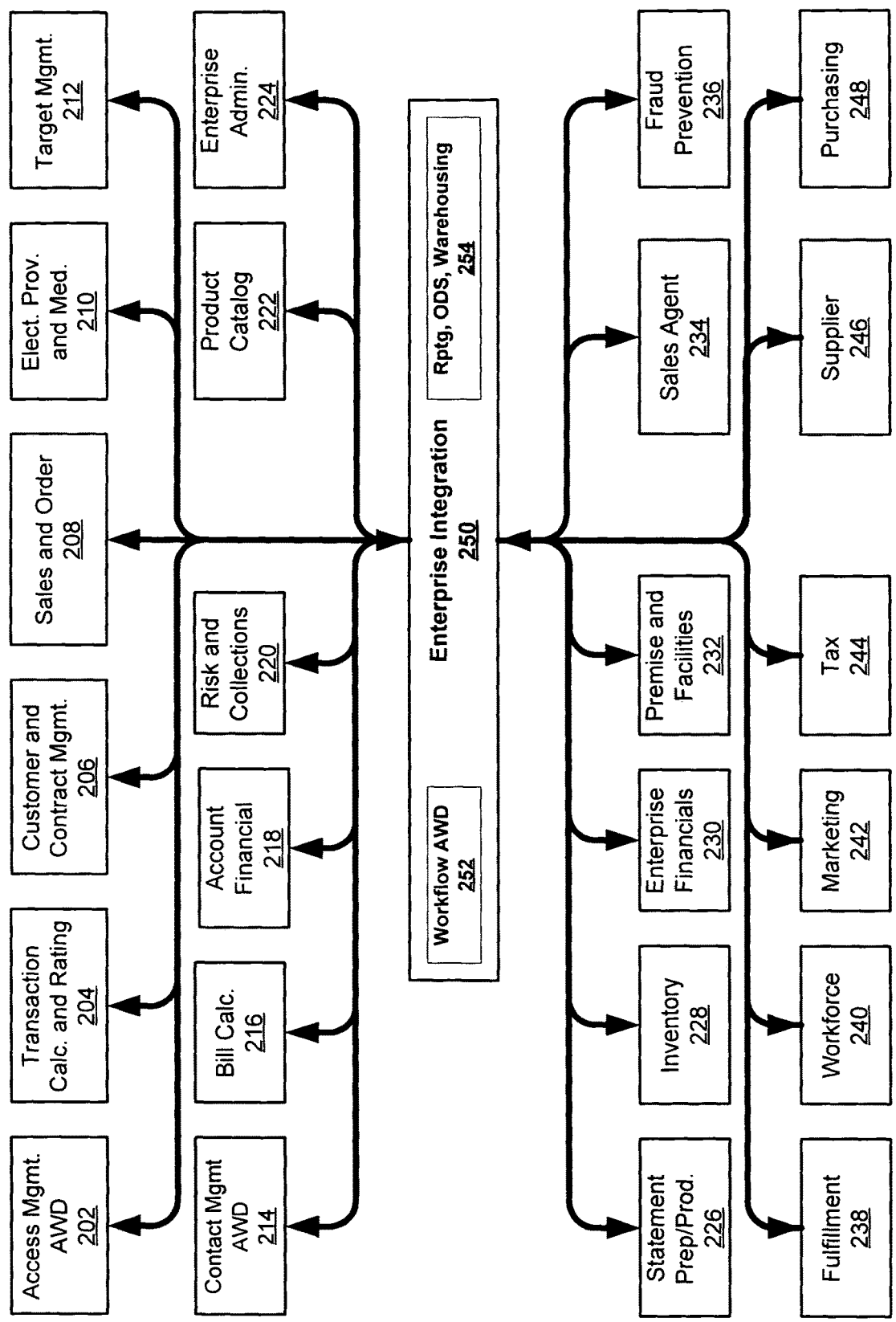
FIG. 2 illustrates an example of a component-based customer care analysis system of FIG. 1.

FIG. 2 illustrates an integrated enterprise system 200. The enterprise system 200 arranges data processing according to business functions, roles, tasks, or combinations thereof. The enterprise system 200 may be a set of federated pre-integrated components, also referred to as modules or subsystems. The enterprise system 200 includes multiple, separable components that represent distributable pieces or implementations of the enterprise system and carry out discrete particular data processing functions. The components may interface with each other and with other applications. The components of the enterprise system may be separately or independently deployed based on the data processing needs of the business organization. A component may include software, documents, files, and objects to carry out a data particular data processing business function.

The enterprise system 200 and the components may be integrated with existing systems, such as legacy systems and 3rd party data processing systems. After the enterprise system 200 is deployed, new components may be added and previously deployed components may be modified without directly influencing other previously deployed components. The enterprise system, and thus business organization, remains flexible because the components may be modified and enhanced without needing to modify the entire an entire customer care system.

Each component of the enterprise system 200 may be deployed according to data processing needs with a stand-alone component, a group, or set, of components, or as a turnkey customer care system. Accordingly, a business's data processing needs may be fulfilled with the identification, selection and deployment of only the components or component groups necessary to carry out the business functions related to those needs.

A turnkey system may include many, all, or substantially all components of the enterprise system and may provide all customer care data processing operations for the business organization. A standalone component of the enterprise system 200 may be deployed, with no other, or minimal other components. A standalone component may provide specific function-based data processing and operate alone, or with minimal other components, such as required and utility components. The standalone components also may be integrated with legacy systems of the business organization.

A utility component is referred to as a component that is used by other components to accomplish a particular business function. A utility component is deployed with dependent component groups or standalone components. A component group represents a set of components that in most situations are deployed together to provide specific needs. The components also may include an integration component that provides basic functionality or that serves as an integration point to a 3rd party system.

Data and information processed by a business may be arranged or organized according to function, role, or task for which the data is processed, recorded, or otherwise maintained. The components of the enterprise system are arranged accordingly a particular or specific customer care business function, role or task. A business function, role, process or task may refer to the one or more steps or activities for attaining a desired business result. The business result may be a single occurrence such as recording a service offered in a catalog. The business result may also occur randomly, such as a transaction with a customer, a maintenance or service call for a customer, or a mass mailing to prospective customers. The business result may occur periodically such as a quarterly statement or annual report, monthly billing, and weekly or daily scheduling.

The data processing components of the enterprise system 200 perform function-specific data processing for the customer care analysis system. The customer care business function, role, or task may include business processes that involve execution of services or production of products. Each component of the enterprise system 200 performs a particular data processing function to carry out a specific business function, role or task. Accordingly, the components of the enterprise system 200 may be referred to as function-based components. Each function-based component may operate or process data substantially independent of and separable from the other function-based components that comprise the enterprise system 200.

The enterprise system 200 also may organize, categorize or align data according to functions, roles and tasks within a business organization. Since each component is functioned-based, the data processed by the enterprise system 200 also may be parsed or arranged according to the function for which the data may be processed, recorded, or otherwise maintained by the business organization. Accordingly, an association between data and a component may be developed. The data may be considered specific to a particular component such that the data is processed, managed and maintained substantially solely by the associated functioned-based component. Likewise, the function-based component is designed to manage and process that particular type of data.

Components of the enterprise system 200 may include an enterprise integration component 250, access management 202, contact management 214, bill calculation 216, account financial 218, customer and contract management 206, electronic provisioning and mediation 210, enterprise administration 224, enterprise financials 230, premise and facilities 232, fraud prevention 236, fulfillment 238, inventory 228, marketing 242, product catalog 222, purchasing 248, risk and collections 220, sales agent 234, sales and order 208, statement preparation and production 226, supplier 246, target management 212, tax 244, transaction calculations and rating 204, workflow 252, and workforce management 240, and other function-based data processing components. Each component may include sub-systems that perform data processing functions related to the component.

The various components may interface through the enterprise integration component 250. The enterprise integration component 250 directs the flow of data to and from the various components. The enterprise integration component 250 also interfaces the enterprise system 200 with third party and legacy components and systems.

The enterprise integration component 250 includes the reporting, ODS, and data warehousing component 254. The data warehousing component 254 handles cross component reporting or sharing of data in the enterprise system 200. To optimize flexibility, integration, and coordination among components of the enterprise system 200, the data warehousing component 254 may include distributed database technology and may include one or more databases configured to store and organize the data processed by the business organization. All data stored in and retrieved from the databases may be directed and managed by the data warehousing component 254.

The enterprise integration component 250 manages and directs data in and out of data warehousing component 254. Data processed by the enterprise system 200 and used by the various components have a common meaning and format. Each component communicates or shares data and results with other components of the enterprise system 200 through the enterprise integration component 254. The enterprise integration component 250 coordinates data and information flow among the components and between each component and the data warehousing component 254. Through the data warehousing component 254, the enterprise integration component 250 centrally holds, maintains and manages the data and information necessary to perform the business organization functions.

The workflow component 252 manages the creation, execution and maintenance of business services provided by the enterprise system 200. A business service may be an atomic unit of functionality that may be requested of the enterprise system. A business service may use one or more of the components to implement a business process. The workflow component 252 manages the flow of data among the various components, schedules the order in which the components process the data, and monitors the data processing by each component to ensure that the execution order of each of the various components is proper for the business service.

The enterprise administration management (EAM) component 224 is a utility component that provides a backbone for the operation of the enterprise system 200. The EAM component 224 administers information about the enterprise system as it is deployed or for a particular installment. The EAM component 224 manages information about the enterprise system as it is deployed or for a particular installation. The EAM component 224 manages all common information for the installation, such as user or retailer profiles, common codes, or profiles for the various components. The EAM component 224 tracks what components are deployed in the system. The EAM component 224 may process data related to the creation of a retailer for the business organization, establishing a user profile for that retailer and managing the relationship of the retailer with the enterprise system 200 and with other retailers for the business organization. The EAM component 224 also may process data related to managing all user profiles for the enterprise system 200. The EAM component 224 creates and maintains profile definitions that will be used by the other components.

The access management component 202 provides access to the enterprise system 200. The access management component 202 manages data related to one or more portals through which the business services and data processing provided by the enterprise system 200 may be accessed and provided. The access management component 202 may maintain data related to web browser user interfaces for customer access and for customer service representatives. The access management component 202 may maintain and process data related to automated computer telephony interfaces (CTI), interactive voice response (IVR) systems, graphical user interfaces (GUI), and e-mail systems.

The transaction calculation and rating (TCAR) component 204 may be considered a utility component. The TCAR component 204 interfaces with the enterprise system and the various components and systems to perform various calculations and ratings. The TCAR component 204 may process data related to calculations of transaction/commitments, tax rating, and pro-rating. The TCAR component 204 also processes data related to pricing of the products and/or services provided by the business organization. The TCAR component 204 may calculate both flat and graduated pricing, one time discounts, total discounts, and volume discounts.

The TCAR component 204 may match usage data and with corresponding product/service and price information to calculate charges for the consumption of the goods and/or services. The TCAR component 204 also provides rating and re-rating of aggregated usage charges and may use various units of measure, including date ranges, distance, amount of time, bandwidth, number of packets, quality of service (QOS), and the like.

The TCAR component 204 also process data related to calculations of discount and fee amounts as well as determining the total charges for a particular bill. The TCAR component 204 may support configurable rounding and prorating methods, proration of prices, discounts, taxes and fees. The TCAR component 204 may calculate a total amount for a line item with multiple quantities, including calculation for pricing, discounts, adjustments, fees, and flat rate taxes and percentage based taxes. The calculation may include appropriate intrastate and interstate taxation based on the nexus that applies and at various levels, including local, state and/or federal taxes, and other fees such as franchise fees. The calculation may also include tax exemptions based on a customer, a product and/or a service.

The TCAR component 204 may employ complex rating methods, including graduate, flat, and installment ratings. The TCAR component 204 may support various types of determinants in calculating charges, including location of service or good, peak time, day of week, Holidays, time of day in hours, minutes, and/or seconds. The charges and discounts may be calculated across multiple accounts in an account hierarchy, and across multiple targets for an account.

The customer and contract management (CCM) component 206 interfaces with the enterprise system and the various components and systems to process data related to customer relations information. The CCM component 206 may process and maintain data related to non-financial customer information and customer contact information. The CCM component 206 also processes data related to service availability for the customer based on provisions of a contract with the customer. The CCM component 206 provides data processing for creating and maintaining the non-financial information related to the customer including customer contact information, the relationship with the customer, customer preferences, demographics, verification, and other non-financial information related to the customer. The information may relate to existing, past or potential customers. The customer demographic information may relate to characteristics of a customer that are used to segment a customer population to determine, for example, purchasing patterns of groups of customers. Examples of demographic information include family size, age, and gender. The customer preference may relate to information on the preferences of the customer such as language spoken.

The CCM component 206 maintains customer information performs the data processing steps for tracking prospective clients, setting up new customers, managing customer information. The CCM component 206 may provide a query of the customer information so that the database may be searched according to various search criteria such addresses, names, social security number, target or the like. The CCM component 206 may manage customer associations and contract associations including associations with one or more accounts, one or more other customers, one or more premises, various agreements and contracts, histories of associations, rebates, billing frequency detail of bill, account hierarchy, customer credit rating, or the like. The CCM component 206 may provide for storage of customer preferences, such as language, preferred contact methods, billing preferences, or the like. The CCM component 206 may also support user or customer defined contract information or preferences, such a billing information.

The sales and order management (SOM) component 208 interfaces with the enterprise system and the various components and systems to process data related to sales and orders. The SOM component 208 may process and maintain data related to order entry, order processing and order tracking, including assembly, validation, and creation of the order. An order may be a record of the sale of a good or service to the customer. The order may be a central document that is used to track the progress of provisioning the order for the customer. The order outlines the goods or services that a customer desires to purchase and the prices for those goods or services. The order also may include any fees, or charges such as shipping and handling charges associated with the order.

An order may be created by a sales agent, or by a customer such as when the customer accesses the enterprise system 200 through the access management module 202. The order may be associated with an electronic provisioned order where the order is electronically provisioned; with a work order where the order is manually provisioned, or with a shipping order if the good is shipped in order to be provisioned.

The SOM component 208 processes a customer's order, including provisioning and charging preference for the customer/sale. The SOM component 208 provides data processing for tracking the order through a life cycle for that order. The SOM component 208 also may provide for reprocessing of the order, if necessary. The SOM component 208 also may process data related to quotes or price estimates provided to customers or potential customers. The SOM component 208 also may process data related to service orders such as when a customer calls the business organization reporting a service problem that the business organization may need to correct. The SOM component 208 may process an order for an estimate, including taxes, fees, charges, discounts, and pricing. The SOM component 208 stores and maintains the various orders and price quotes and provides support for presenting pricing comparisons. The order may be received from various sources and may be for multiple services and/or goods. A payment method and/or pre-payment requirement may be specified with the order. When an order is received, the SOM component 208 may determine whether an ordered good is currently available or a backlog for providing the goods and/or service. The SOM component 208 may be used to retrieve historical order records, may be used to retrieve, cancel, or modify existing or pending orders.

The electronic provisioning and mediation (EPM) component 210 interfaces with the enterprise system and the various components and systems to process data related to e-provisioning. The EPM component 210 may provide data processing and maintenance of data related to electronic provisioning of a product and/or service to a customer. The EPM component 210 also receives and mediates usage related messages from a network for the enterprise system 200. The EPM component 210 receives and processes high volumes of electronic provisioning requests from within the business organization or from other sources such as a business partner or sister company. The EPM component 210 may interface with multiple electronic provisioning systems and may be integrated to a new electronic provisioning interface without disruptions to existing interfaces. The electronic provisioning may include messages from a single target, multiple targets, no targets, or any combination of targets. The EPM component 210 may maintain electronic provisioner configurations such as zip codes for blackout regions. Through configurable rules, information to be included in electronic messages to electronic provisioners may be specified, such as activity time periods for processing and the priority in which they may be processed.

The target management 214 component interfaces with the enterprise system and the various components and systems to process data related to targets. In an embodiment, the target management component 214 maintains the customer configuration data of deployed targets or electronically provisioned equipment, such as Smartcards, phone numbers, and addressable units. A target may be an entity that is the object of electronic provisioned products, including devices or components of a device that receives and sends electronic signals. An example of such a target includes Smartcards. The target management component 214 maintains the relationship between a retailer's view of the target and the provisioner's view of the target. The target management component 214 maintains data related to equipment and target configurations used by the enterprise system 200. The target management component 214 may apply monthly (periodic or cycle) and non-recurring charges, promotions, and discounts. The target management component 214 may support rules-based validation of attributes specific to a target type and electronic provisioner. The target management component 214 provides target history and may support the addition, modification, or deletions of targets. Targets may be retrieved and viewed, including associations of the target. The target management component 214 also supports multiple identifiers types for equipment, such as serial number, unit address, DOCSIS MAC address, Ethernet MAC address, Set-Top MAC address, USB MAC address, Smart Card or POD identifier, or the like.

The contact management 214 component interfaces with the enterprise system and the various components and systems to process data related to communications. The contact management component 214 may process and maintain data related to tracking incoming and outgoing exchanges with users of the enterprise system 200. The contact management component 214 records the communication between a customer, including prospective customers and the enterprise system 200. The contact management component 214 also may process and maintain data related to characteristics of the communications with the enterprise system 200. The characteristics may include the media used, reasons for communication and results of the communication. The communication may take the form of e-mail, telephone conversation with a customer representative, written correspondence, and World Wide Web or other public network interface.

The billing calculation component 216 interfaces with the enterprise system and the various components and systems to process data related to billing or invoicing. The billing calculation component 216 calculates an invoice based on a billing cycle or demand for a service or good. The billing calculation component 216 may accumulate all charges for a customer and recalculate the charges to the customer as necessary based on pricing plans, discounts, customer contracts, incentives or promotions or other factors that may require a discount on the bill. The invoice or bill may include taxes, local, national or other taxes, associated with the goods or services provided to the customer. The bill may list payments received or outstanding amounts past due.

The billing calculation component 216 supports an unlimited number of billing cycles having configurable dates and due dates for the bill. A bill may be suspended and resumed. The bill may be configured according to the business organizations financial or accounting needs and/or the customer's billing preferences. The billing calculation component 216 may evaluate and notify collections of accounts with past due status and may automatically verify recurring product renewal completion. The bill may be include exceptions, reversals, special fees, and may be an on-demand bill, a periodic bill, a final bill, a first bill, a suspended account statement. The bill also may include a statement of multiple accounts, including accounts of other customers.

The customer account financial management (CAFM) component 218 interfaces with the enterprise system and the various components and systems to process data related to customer financial information. The CAFM component 218 may process and maintain data related to a financial relationship with a customer and may also service the creation and maintenance of customer financial data. Such information may include customer account information, account preferences, account associations, maintenance of account ledgers, fee management, credit history, tracking of financial transactions, agreements with the customer, subscription or commitment applications, relationships between customer agreements and targets, billing cycles and addresses, loyalty accounts, payment processing, write-offs and refunds, dealer incentives or sales, retailer associations, and customer purchased products and/or services. In an embodiment, the CAFM component 218 processes data related to the order processed by the SOM component 208 in order to post a record of the sale to a ledger account for the customer. The CAFM component 218 also may track the account billing cycle for the customer.

The customer account information is handled separately from the customer information. For example, financial account information for a customer may be managed and processed by the CAFM component 218 and the personal information associated with the customer may be managed and processed by the CCM component. The customer account may be a unique financial relationship with the customer. The account may be associated with other related accounts. The account billing cycle is the time period that represents the dates that an account is invoiced and the effective dates of the invoice. The account ledger for the customer may be the chronological listing of the financial activity on a customer account, including charges, fees, payments, billings, and adjustments. The CAFM component 218 may process data related to financial summaries of customer accounts, including credit actions and payments for a predefined period. The CAFM component 218 may post credits and debits to a general ledger, maintain a history of financial transactions, manage account hierarchy, and maintain payment rules across various account hierarchies. The CAFM component 218 may manage customer billing cycles/frequencies and may process data related to rules for determining billing cycles/frequencies for a customer or customers. The CAFM component 218 supports various accounting methods such as open item and balance forward accounting.

The risk and collections management component (RACM) 220 interfaces with the enterprise system and the various components and systems to process data related to credit risk. In an embodiment, the RACM component 220 may determine a risk of non-payment of and collection of delinquent accounts. The RACM 220 may process data and information to implement a collection plan, including a set of rules and specifications that are used to determine events that trigger collection activities. The collection plan also may include those actions that may be taken on customer accounts identified for collection activities. The RACM component 220 may provide risk assessment based on credit profiles and may trigger an accounts receivable department to perform collection activities. The RACM 220 also may provide data to a contractor such as a collection agency, to carry out the determined collection activities.

The product catalog component 222 interfaces with the enterprise system and the various components and systems to process data related to product and/or service offerings. In an embodiment, the product catalog component 222 may manage product and/or product package pricing, discounts and commitments. In an embodiment, the product catalog component 222 interfaces with other components and processes and maintains data associated with product and/or service offerings of a business organization. A commitment may be considered the details of a contract specifying the minimum amount of time that a product and price must be held by a customer to avoid incurring penalties. A package may be considered a group of retail products or services presented as a single group for sale and/or distribution.

The product catalog component 222 may process data to create and maintain products and/or services for multiple lines of business (LOB), including for example, video/audio (Direct-to-home, Cable etc), Internet, ISP, broadband, merchandise, telephony and the like. The product catalog component 222 may be configured to process data according to rule-based associations of products and/or service with retailers, merchants, multiple price structures, multiple discounts, packages, and loyalty rewards or other marketing programs. The product catalog component 222 may manages definitions and maintenance of price structures such as a one-time charge, recurring charges, or installment charges. The pricing structure may be flat, tiered, metered, cost based, or time-based. The product catalog component 222 may support rules-based associations or price structures and may support configurable product and/or service ranking such as for upselling or display purposes. The product catalog component 222 may support configurable rules for determining eligibility based on who may sell a product or service, and what if any discounts are available, who can purchase a product and/or service, what is a minimum level of service, optimal pricing, upselling, any combination of these, or the like.

The statement preparation and production (SPP) component 226 interfaces with the enterprise system and the various components and systems to process data related to financial statements and account billing. In an embodiment, the SPP component 226 may process data for determining a remittance label for a statement, and aggregating bills for an account hierarchy into a single statement. The SPP component 226 also may prepare a summary statement or a detail statement for printing. The SPP component 226 manages text, formatting and other information provided on a statement, e-billing, and print/mail services. A statement may be a summary of a customer's or retailer's account activity for a specified period or for a billing period or other period. The statement may be distributed through various communication media such as print, mail, electronic billing, e-mail messaging, any combination of these, or the like. The statement may be prepared according to rules for providing, for example, a detailed versus summary type bill, summary of charges for a single item, suppression of specific products and/or services and associated charges and the like. The SPP component 226 may be integrated with or interface with other components, legacy systems, or third-party systems such as a postal presort system, automated printing or finishing, post processing, any combination of these or the like. The SPP component 226 supports various accounting methods such as open item and balance forward accounting.

The inventory management component 228 interfaces with the enterprise system and the various components and systems to process data related to tracking products and supplies. The inventory management component 228 may track all inventory of a business, a partial inventory for the business, or inventory for particular physical locations of the business organization. The inventory management component 228 maintains the quantity and composition of stock of products, supplies and other physical assets. The inventory management system 228 also may track the physical location, such as shelf number or warehouse location.

The inventory management component 228 processes data related to receiving inventory using various data inputs such as key entry, electronically reading data, magnetically reading data, or optically reading data. The inventory management component 228 support rules-based inventory control and maintenance for multiple types of inventory, inventory schema, inventory status, associations between inventory status, provisioning, and inventory expiration. The inventory management component 228 may track items of inventory based on serialized numbers, assignments to locations, assignments to customers, user defined tracking, or the like. Inventory costs may be tracked, and items may be deleted or added based on changes in inventory status. The inventory management system 228 may manage and track inventory according to media access control (MAC) for various pieces of equipment and supplies. The inventory management system 228 may manage inventory history and provide data processing for recording and viewing equipment history, repair history, polling history, diagnostic history. The inventory management system 228 may provide data processing for determining depreciation of equipment and for various types of inventory ordering, such as just-in-time, minimum quantity order, and automated replacement ordering.

The enterprise financials component 230 interfaces with the enterprise system and the various components and systems to process data related to all of the financials processes for the business organization. The data may include fixed asset accounting, all general ledger feeds, account receivables, account payables, revenue recognition and financial period setup, processing and management. The enterprise financials component also may interface with third parties to accept and process electronic fund transfers, and credit card credits and debits.

The premise and facilities component 232 interfaces with the enterprise system and the various components and systems to process data related to asset control. The premise and facilities component 232 may process and record data related to fixed assets. The premise and facilities component 232 creates and maintains data related to the assets of the business organization and scheduling maintenance and inspections of these items. The premise and facilities component 232 tracks the location of these assets, the relationship with other assets, hierarchy of the assets and histories. A fixed asset may be considered a tangible property used in the operation of a business organization and not expected to be depleted or otherwise consumed or converted to cash in the ordinary course of events. Such assets include plants, machinery, equipment, furniture, and fixtures.

The sales agent (SA) component 234 interfaces with the enterprise system and the various components and systems to process data related to a sales force. In an embodiment, the SA component 234 creates and maintains sales agent information, including adding new sales agents, deleting sales agents and maintaining current information. Sales agents include sales representative, customer service representative, contractors, retailers, direct sales representatives, dealers and the like.

The SA component 234 may provide rule-based information processing for managing sales agent activities, calculations of commissions and rewards, and what the sales agent is authorized to sell. The information may include how a sales agent is to be compensated, such as a commission plan, a commission rate and incentives. The information also may include that association between and among sales representatives. A commission may be considered the payment made to the sales agent for a sale of a service or good. The commission plan may be considered the total arrangement for compensation for a particular sales agent or agents. The SA component 234 may process data related to associations between sales agents and retailers, historical sales information for a sales agent or group of sales agents, commission plans and incentive plans. The SA component 234 may support a tiered structure for qualifying a sales agent and for awards programs.

The fraud prevention component 236 interfaces with the enterprise system and the various components and systems to process data related to preventing fraud. In an embodiment, the fraud prevention component 235 monitors the enterprise system to detect acts of deliberate deception. For example, the fraud prevention may monitor or work with the access management component 202 to detect unauthorized access. The fraud prevention component 236 also may monitor use of the enterprise system for unauthorized uses of products sold or services provided. The fraud prevention component 236 also may monitor or work with customer account information to avoid manipulation of data for improper billing activities.

The fulfillment component 238 interfaces with the enterprise system and the various components and systems to process data related to fulfilling requests of a business organization. The fulfillment component 238 may process and maintain data related to drop shipment of products to a customer or completion of a service provided. The fulfillment component 238 may track the shipping and handling charges assessed by a fulfillment vendor. A fulfillment vendor may be considered a provisioner that provisions the product to the customer by shipping the product.

The workforce component 240 interfaces with the enterprise system and the various components and systems to process data related to employees, contractors, agents, affiliates and the like. The workforce component 240 may process and maintain data related to creating, scheduling, processing, dispatching and tracking a workforce for the business organization. The workforce component may include maintenance of resources, quota, skill levels of the workforce, and skill levels for particular tasks. The workforce management component 240 may maintain a calendar for reckoning length and divisions of work periods used in scheduling work orders.

The marketing component 242 interfaces with the enterprise system and the various components and systems to process data related to marketing activities. The marketing component 242 may process and maintain data related to the creation, scheduling, maintenance, and tracking of campaigns, such as advertising campaigns and promotions.

The tax management component 244 interfaces with the enterprise system and the various components and systems to process data related to taxes. In an embodiment, the tax management component 244 tracks tax regulation and rules for the implementation of goods and service. The tax management component 244 may maintain a tax table, including list of the rules, rates, and applicable jurisdictions for assessing taxes on products and or services provided to customers.

The supplier component 246 interfaces with the enterprise system and the various components and systems to process data related to suppliers. The supplier component 246 may manage data for multiple suppliers and/or vendors for the business organization and for specifications of the supplier, and the supplier's products and/or services. The supplier component 246 also may include tracking and maintenance of royalty payments or settlement payments, including payments for the right to use property such as copyrighted materials, patented technology, or natural resources.

The purchasing component 248 interfaces with the enterprise system and the various components and systems to process data related to procurement of inventory and/or supplies. The purchasing component 248 may create and maintain purchase orders and track purchase orders that have been placed. The purchasing component 248 may track stipulated pricing with suppliers or for specific goods and services.

Other components that provide function-specific data processing also may be provided. Such other components may include a human resource, employee benefits, legal service and support, retirement services components or other business function-based components.

The components of the enterprise system 200 include standalone components and utility components. The enterprise system also may include components considered integration components. The components also may include groups of components that may be deployed as a package.

Figure 3:
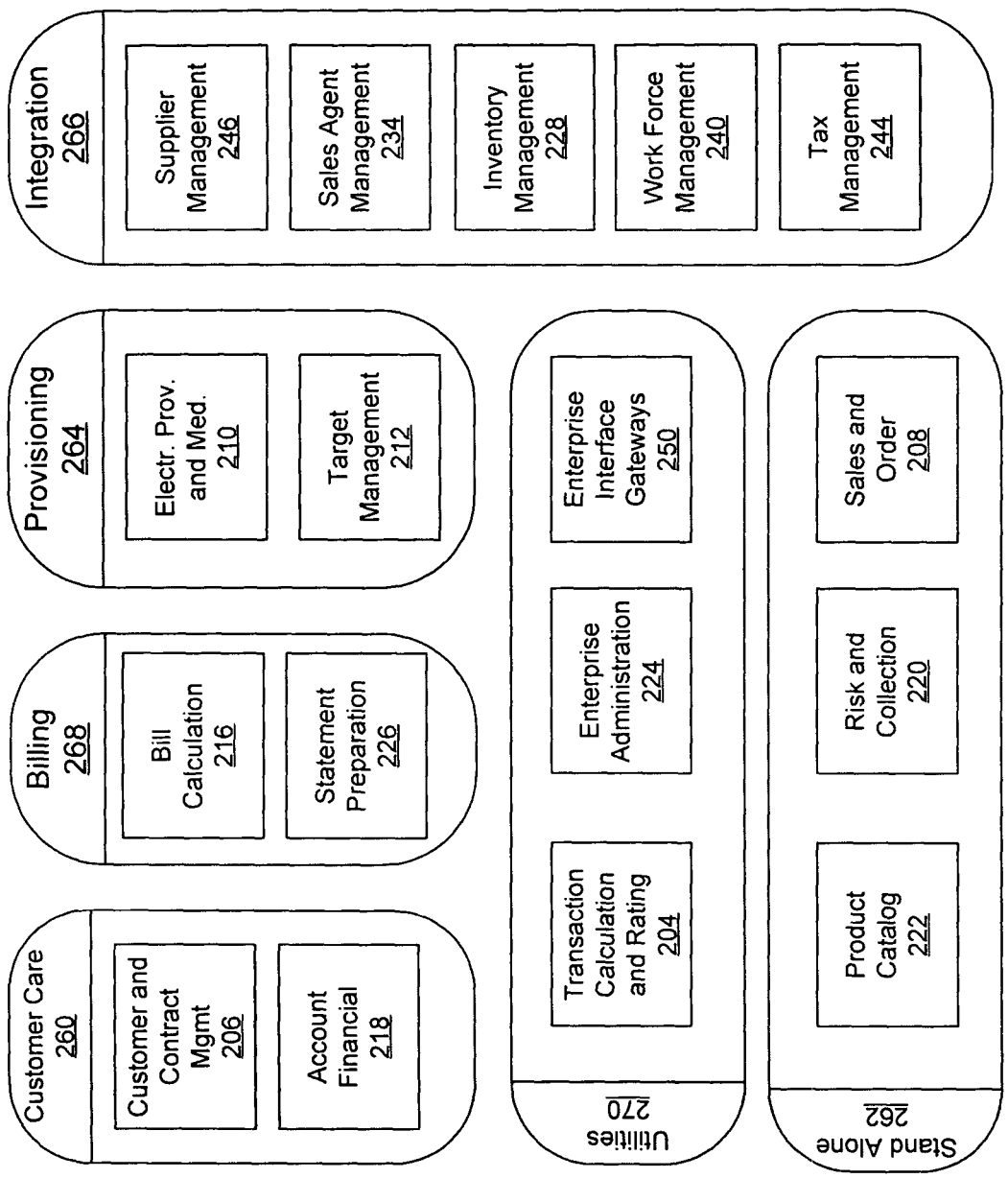
FIG. 3 illustrates examples of groupings of components.

FIG. 3 illustrates examples of utility components 270 of enterprise system 200. The utility components 270 provide utilitarian data processing functions for the enterprise system 200. The utility components 270 are used by other components to accomplish their business function. The utility components 270 include the TCAR component 204, the enterprise administration component 224, and the enterprise integration component 250. The utility components 270 provide data processing services that are provided to other components of the enterprise system 200. For example, the enterprise administration 224 component tracks which the other components are deployed for a particular business organization. The enterprise administration component 224 may provide information about which components are deployed and the profile for the deployed enterprise system 200. This data may be useful to other components to perform the specific functions.

FIG. 3 also illustrates the components of the enterprise system 200 that may be considered standalone components 262. A standalone component 262 may be considered a component of the enterprise system 200 that provides specific function-based data processing. The standalone component 262 may operate alone, or with minimal other components, such as one or more utility components. The standalone components 262 also may be integrated with legacy systems of the business organization. The standalone components 262 may include the product catalog component 222, the risk and collection component 220, and the sales and order component 208. Other examples of standalone components include access management 202, contact management 214, workflow 252, and marketing 242. Utilities for the standalone components may be provided by the enterprise administration component 224.

The risk and collections component 220 may also be deployed with the transaction calculation and rating component 204 a customer care group 260, and the product catalog 222. The sales and order management component 208 also may be deployed with the transaction calculation and rating component 204, the customer care group 260, a provisioning group 264, the fulfillment component 238, the workforce management component 240, the risk and collections component 220 and the inventory component 228. The product catalog 222 also may be deployed with the enterprise financials management component 230, supplier component 246, sales agent component 234, inventory component 228, tax management component 244, and the provisioning group 264.

FIG. 3 also illustrates components that may be considered integration components. An integration component may be considered a component of the enterprise system that may provide basic data processing functionality and serve to interface with $3^{rd}$ party or legacy data processing systems. Examples of integrations components include the supplier 246, sales agent 234, inventory 228, work force 240 and tax 244 components. Examples of other integration components include the facilities 232, enterprise financial 230, fraud prevention 236, purchasing 246, and fulfillment 238. The integrations components may provide data processing for the enterprise system and interface with other data processing systems.

FIG. 3 also illustrates three groupings of components, including the customer care group 260, the billing group 268, and the provisioning group 264. The groups, when deployed together, address an area of business problems or services such as billing and customer care needs.

The customer care group 260 may include the customer contract management 206 and the account financial 218 components. The customer care group also may be deployed with the transaction calculation and rating 204 and the facilities management 232, the sales and order management 208 and the billing group 216 components. The financial management 218, sales agent management 234, supplier management 246, and risk and collections 220 also may be deployed with the customer care group as desired by the business organization.

The billing group may include the billing calculation 216 and statement preparation 226 components. The billing group may be deployed with other components such as the transaction calculation and rating 204, and tax management 244 components.

The provisioning group 264 may include the electronic provisioning and mediation 210, the target management 212. The provisioning group 264 also may include the inventory 228 component, and the transaction calculation and rating 204 components. Other components that may be deployed with the provisioning group include the sales and order management component 208 to drive the provisioning process and accepts network orders. Similarly, the provisioning group may be deployed with the customer care group 260, product catalog 222, and the purchasing component 248.

Figure 4:
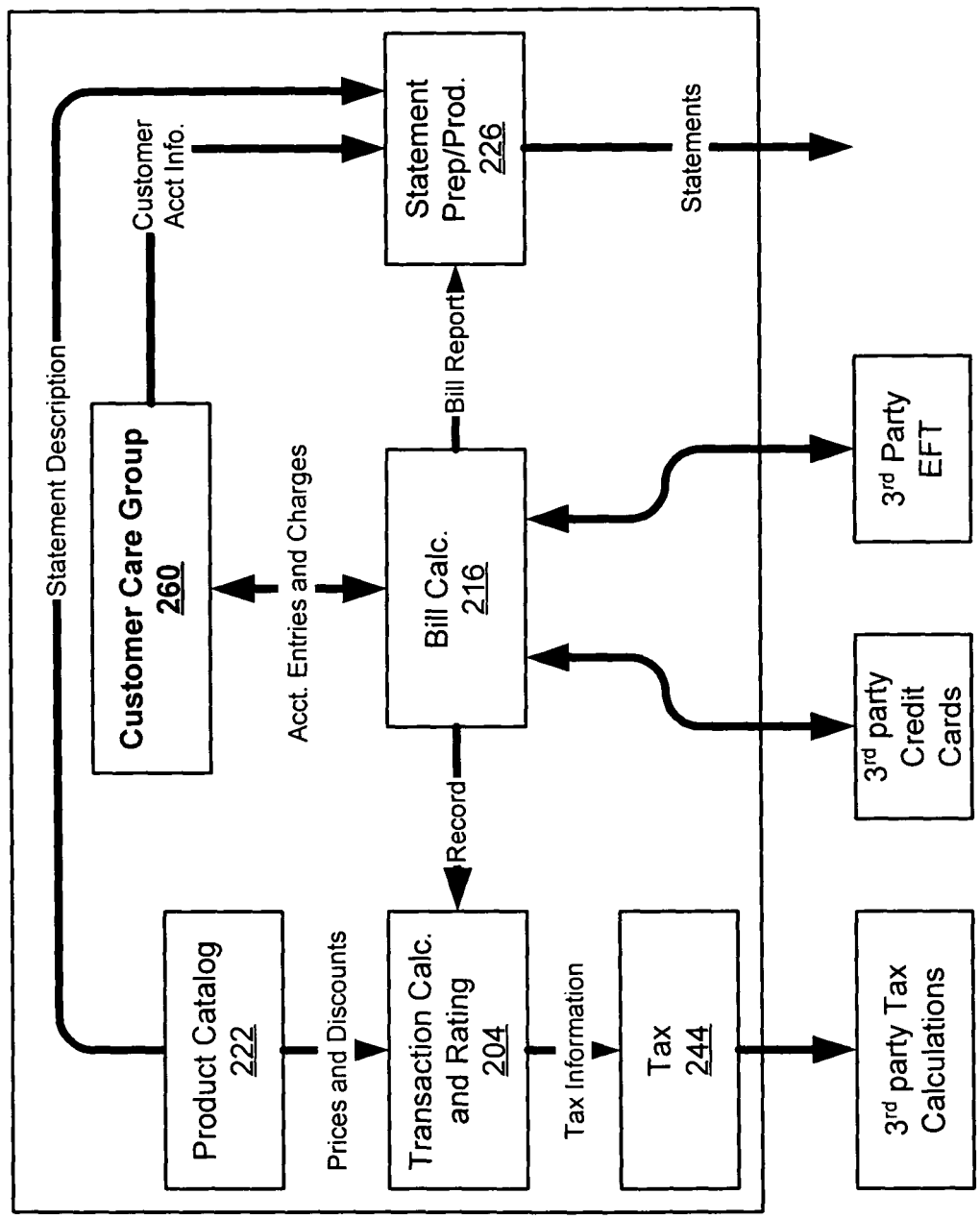
FIG. 4 illustrates a dependency diagram for an exemplary billing group of FIG. 3.

FIG. 4 illustrate a dependency diagram for the billing group 268. The diagram illustrates the distributed data processing features of the enterprise system 200. The billing calculation component may share data with the customer care group 260, such as account entries and account charges. Based on the account entries and billing information processed by and received from the customer care group 260, the billing calculation component 216 may determine a billing report for the customer. The billing calculation component 216 also may provide the data processing results, such as new account charges of billing information, to the customer care group 260. The billing calculation component also may provide the bill report to the statement preparation and production component 226 for printing and presenting to the customer. Based on the account and billing information, the billing calculation component 216 also may present the charges to $3^{rd}$ party systems such as a credit card processing system or an electronic fund transfer system. The billing calculation component 216 interfaces with the transaction calculations and rating component, for example, to determine the transaction amount and update and rating information. The transaction calculation and rating component 204 may query the product catalog 222 to determine the price for the service to the customer. The product catalog 222 also may provide corresponding information to the statement preparation and production component 226 for inclusion with the statement presented to the customer. Finally, in the example of FIG. 4, the transaction and rating component 204 may provide tax information to the tax management component 244 for further processing. The components shown in the dependency diagrams of FIG. 4 may be components of the enterprise system or $3^{rd}$ party data processing systems.

Figure 5:
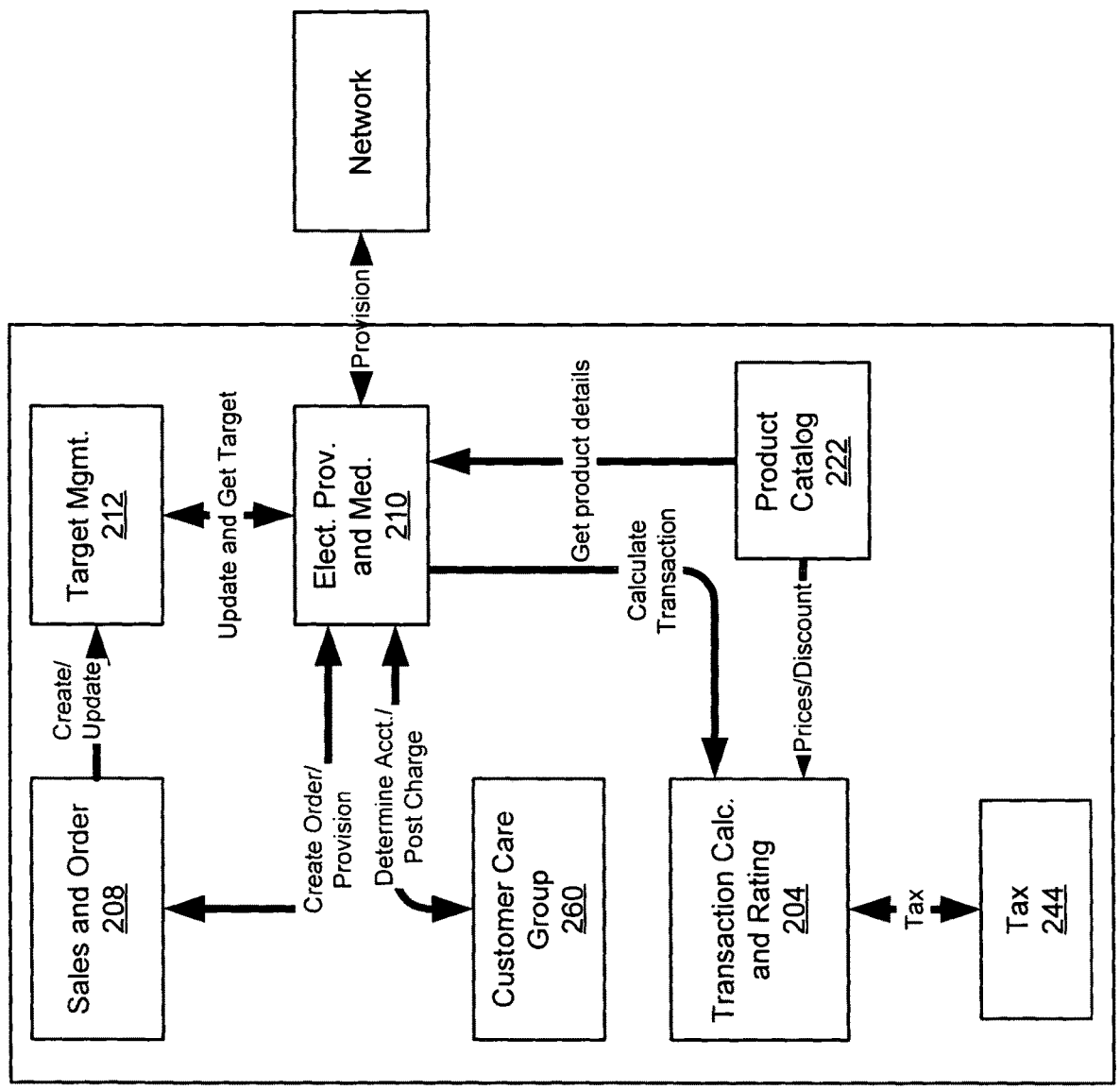
FIG. 5 illustrates a dependency diagram for an exemplary provisioning group of FIG. 3.

FIG. 5 illustrates a dependency diagram for the provisioning group 264 of FIG. 3. The enterprise may receive an electronic order from the network connection. The electronic provisioning and mediation (EPM) 210 component receive the event information from the network. The EPM 210 gets target information from the target management component 212 and also may provide updated information to the target management component 212. The EPM 210 receives the provision configuration for the event/order from the order management component 208 and provides the created order to the order management component 208. The charges may be posted to the customer's account by the customer care group 260. The EPM receives the pricing information from the product catalog 222, which also provides the pricing and discount information to the transaction calculation and rating component 204. The EPM 210 queries the transaction calculation and rating component 204 to calculate the amount for the transaction. Finally, the transaction calculation and rating component 204 may share tax information with the tax management 244 component. The components shown in the dependency diagrams of FIG. 5 may be components of the enterprise system of $3^{rd}$ party data processing systems.

Figure 6:
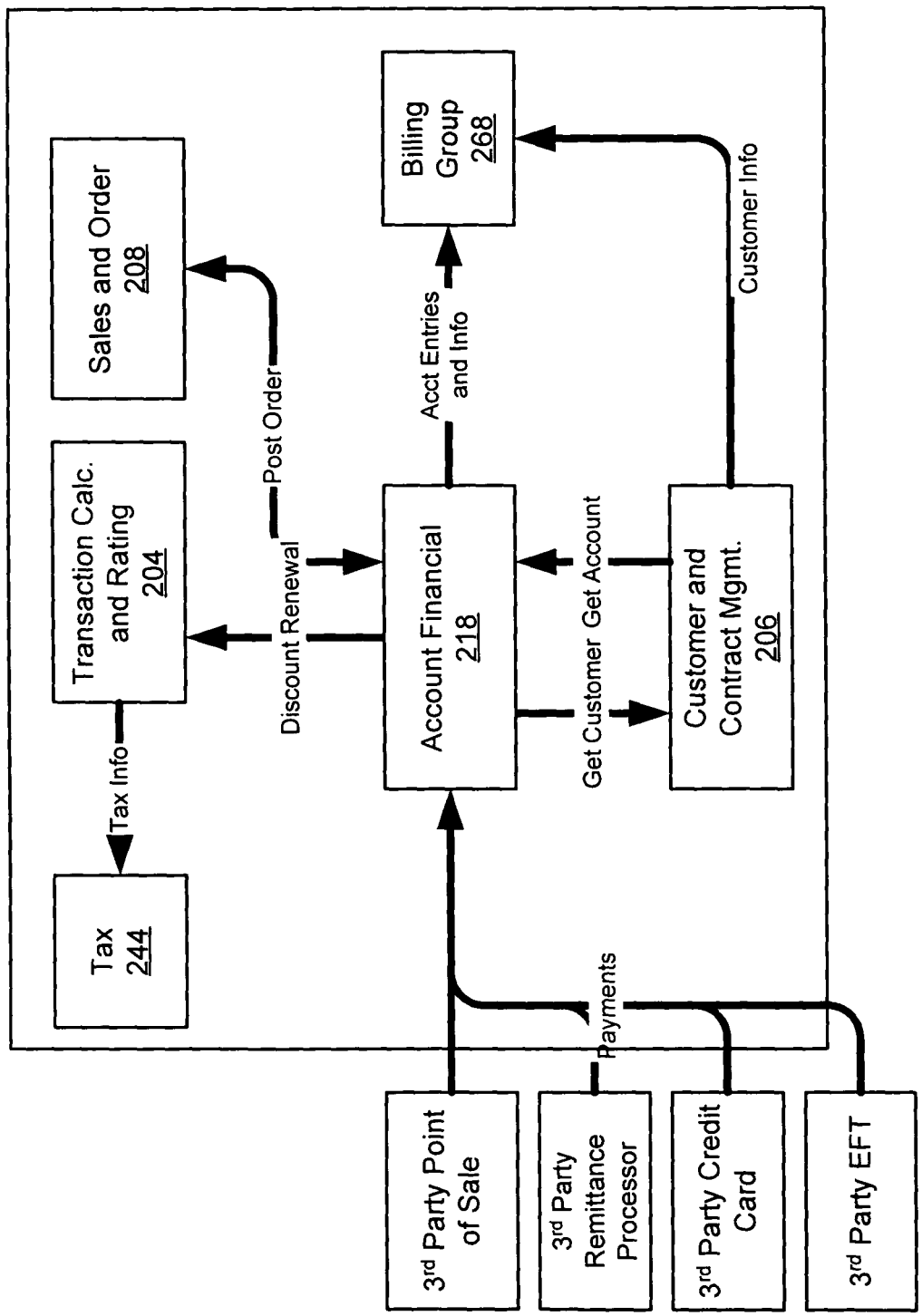
FIG. 6 illustrates a dependency diagram for an exemplary customer care group of FIG. 3.

FIG. 6 illustrates a dependency diagram for the exemplary customer care group 260 of FIG. 3. The customer care group 260 may track account information for a customer. Payments for services and/or goods may be received from the customer or paid on behalf of the customer through $3^{rd}$ party data processing systems. An order for services provided or goods rendered to the customer may be provided to the enterprises system 200 through the sales and order management component 208. The sales and order management 208 may communicate with the account financial component 218 to post the order. The transaction amount is determined by the transaction calculation and rating component 204, which communicates tax information with the tax management component 24. A payment from the customer may be received from a point of sale system, a remittance provider a credit card or from an electronic funds transfer processor. The payments are received by the account financial component 218. The account financial component 218 communicates with the customer and contract component 206 to determine customer account information. The customer and contract management component 206 also provides the customer information to the billing group 268 for processing a bill to the customer. The account financial component 218 also communicates account entries and information with the billing group 268 for processing the bill that is presented to the customer. The components shown in the dependency diagrams of FIG. 6 may be components of the enterprise system of $3^{rd}$ party data processing systems.

Other groups and their dependencies may be developed and deployed. The above groups also may be modified or customized to provide a desired data processing service.

Figure 7:
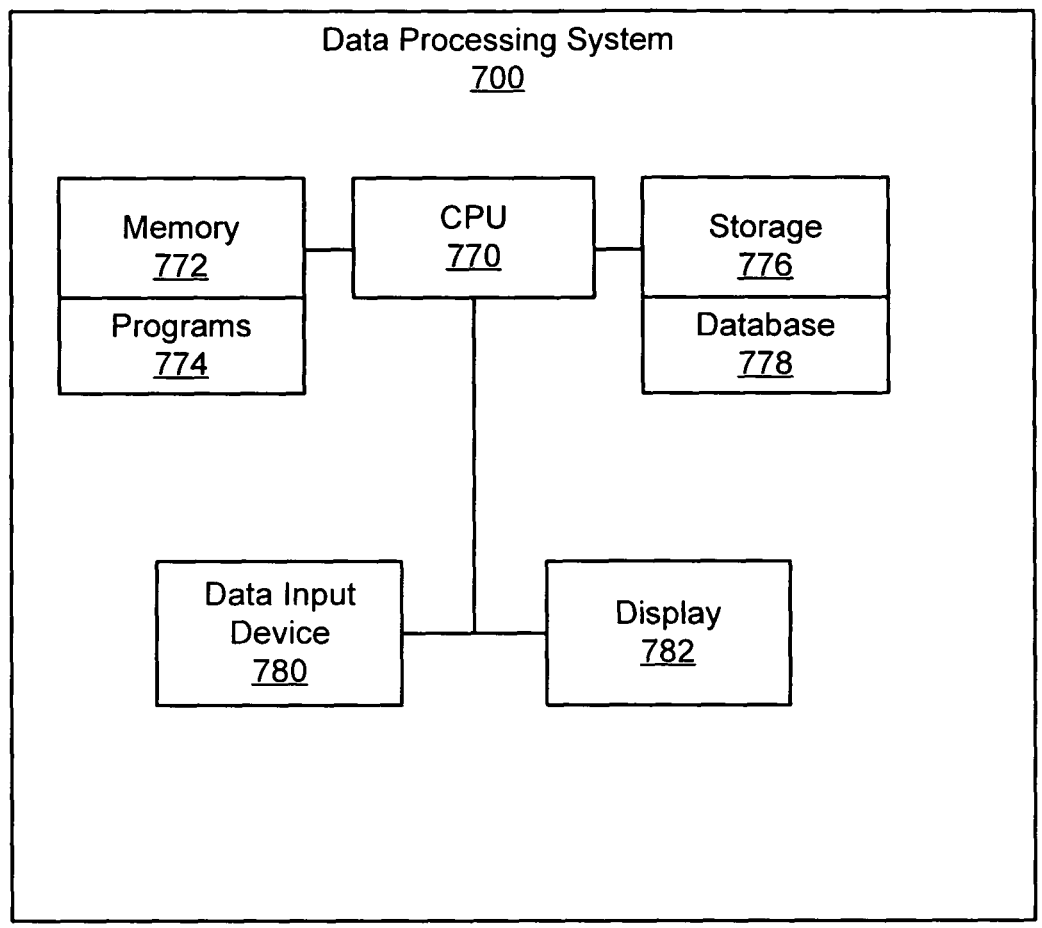

FIG. 7 illustrates an exemplary data processing system 700 with which an embodiment enterprise system may be used. The data processing system 700 is provided for descriptive purposes and is not intended to limit the scope of the enterprise system. The concepts apply to all computer and controller systems such as personal computers, computer networks, workstations, mainframe computers and the like.

In an embodiment, the enterprise system may be implemented with the data processing system 700. The enterprise system and the components of the enterprise system may be embodied as computer software including object and/or source code, hardware, or a combination of software and hardware. The enterprise system and its components may be stored on a computer-readable medium installed on, deployed by, resident on, invoked by and/or used by one or more computers, clients, servers, gateways, or a network of computers, or any combination thereof. The computers, servers, gateways, may have a controller capable of carrying out instructions embodied in the computer software. The enterprise system and its components may be implemented using any known software platform or frameworks including J2EE™, Oracle 9i, XML, Visual Basic, API based designs and like component-based software platforms.

The data processing system 700 may include a central processing unit 770, a memory 772, a storage device 776, a data input device 780, and an output device such as display 782. A program 774 may reside on the memory 772. The program 774 may include one or more sequences of executable code or coded instructions. The program may be loaded into the memory 772 from storage device 776. The CPU 770 may execute one or more sequences of instructions of the program 774 to process data. Data may be input in to the data processing system 700 with data input device 780. The program 774 may interface data input device 780 for the input of data. Data processed by the data processing system 700 may be output on the display 782. The program 774 may also interface display 782 to output data.

The storage device 776 may store a database 778. The database 778 may include a collection of files composed of organized records that may include fields of data. The data may be retrieved and stored in the database 778. The CPU 770 may interface the database 778 for storage and retrieval of data. The components of the enterprise system may reside in memory 772 and/or storage 776 during operation of the data processing system 700 and may be invoked by the CPU 770 for data processing.

Figure 8:
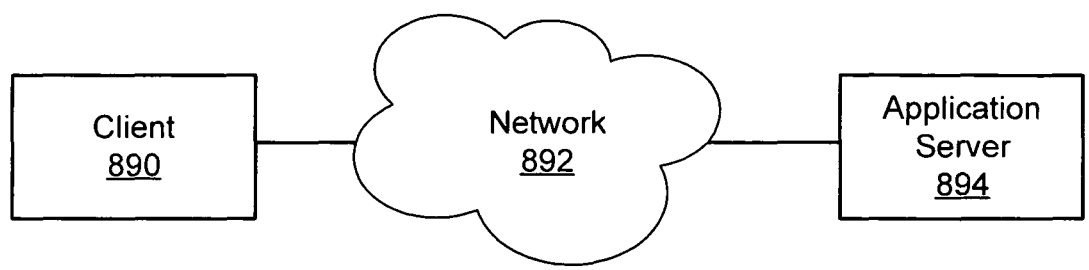

FIG. 8 depicts another embodiment for the enterprise system. The enterprise system may include a client 890 such as a computer linked to an application server 894 over a network 892. The application server 894 may contain software executable code for carrying out data process function consistent with the enterprise system. For example, components of the enterprise system may reside on application server 894. A user may access the application server 894 using the client 890 linked to the application server 894 over network 892. Data may be shared between the client 890 and the application server 894 over the network 892. Client 890 may have a browser that allows the user to interact with the application server 894. The browser may transmit and receive files. The files may be a web page that includes images and/or textual information that provide an interface for receiving information from the user. The web page may be based on HTML, Java, or other web-based applications. Examples browsers include Netscape Navigator and Microsoft Explorer.

Application server 894 may store the components of the enterprise system. The Application server 894 may receive requests from client 890 and transmit data to the client 890. The application server 894 may perform the data processing functions or may share data processing functions with client 890.

The enterprise system may provide documents, reports, projections and statements based on the data processed. The enterprise system various types of business organizations. For example, the enterprise system may be configured to provide an automated solution for customer care and billing business processes for a satellite television provider. Components of the enterprise system may be deployed to process data related to inventory, manage orders from a sales or work force for goods or services, and provide financial reports to a financial department, provide scheduling of the service, and make general ledger entries for the satellite television provider.

The enterprise system also may be integrated into a heterogeneous environments to interact with other business processes, 3rd party customer relationship management systems, multiple billing systems and other systems or legacies that are used by the business organization to provide services and or goods its customers. The enterprise system may include components that interface with third party systems such as credit card service providers, remittance service providers, mail providers, and electronic funds transfer service providers. Statements may be prepared according to the processed data and output by the enterprise system.

The enterprise system may be modified without significant or substantial recoding of software by which the enterprise system may be embodied. The enterprise system may be modified according to adjustments to business models, structures of changing markets without modification to data structures. A business organization may deploy the enterprise system according to current data processing needs and add components, modify existing components or eliminate components as the needs of the business changes or grows. Since the enterprise system is component-based, modification to components may be made without needing to modify the entire customer care system.

The business organization can continuously improve its quality by running implementing the components that best fit its data processing needs. A deployed enterprise system may be a standalone component, a group of components, or a fully automated and complete back-office operation. The enterprise system may be modified without significant or substantial recoding of software. The enterprise system may be modified according to adjustments to business models, structures of changing markets without modification to data structures.

Various embodiments of the enterprise system have been described and illustrated. However, the description and illustrations are by way of example only. Many more embodiments and implementations are possible within the scope of this invention and will be apparent to those of ordinary skill in the art. Characteristics for the components and processes described herein may be varied to implement a component-based customer care management system within the scope of this invention.

For example, the component-based customer care management system may include a component that performs the function of generating financial reports to a financial department and another component may determine a commission report for a sales agent. A group of component may handle data processing related to interfacing with clients including a client interface component to accept orders, a product catalog to provide a product offering information, customer and contract management to track non-financial information, and client contact components to track communications.

While the embodiments have been described with respect to a particular function-based component, those skilled in the art will recognize that the advantages may be extended to various other components. The enterprise system may be used for various business organizations and with various techniques for data processing. Accordingly, the invention is not to be restricted except in light as necessitated by the accompanying claims and their equivalents.

What is claimed is:

1. A method comprising:
   storing, by an application server of a computer system, a plurality of separable and preconfigured data processing components that are each executable to perform a particular data processing function on a particular type of data to carry out a specific business function, role or task;
   making, by the application server, the data processing components available to a plurality of different business organizations;
   receiving, by the computer system from each of the business organizations, a selection of a subset of the data processing components to deploy;
   deploying, through the application server of the computer system for each of the business organizations, the selected subset of the data processing components, including:
   (a) receiving, from a client, customer data via a plurality of interfaces of the computer system including an automated computer telephony interface (CTI), an interactive voice response system, a graphical user interface (GUI), and an e-mail system;
   (b) determining, by the computer system, one or more of the deployed data processing components that is executable to perform a particular data processing function on a type of the received customer data;
   (c) organizing, in a database of the computer system, the received customer data according to the determined one or more data processing components, including associating, in the database of the computer system, the received customer data with the determined one or more data processing components;
   (d) based on the association in the database, executing, through the application server of the computer system, the determined one or more data processing components on the received customer data including performing the data processing functions of the determined one or more data processing components on the received customer data; and
   (e) providing, to the client by the application server of the computer system, a result of performing the data processing functions on the received customer data.

2. The method of claim 1, further comprising:
   receiving, by the computer system from one of the business organizations, a modification of the subset of the data processing components to deploy; and
   responsive to receiving the modification, deploying, by the through the application server of the computer system for the business organization, the modified subset of the data processing components.

3. The method of claim 1, wherein the computer system provides a workflow component that, for each of the business organizations, schedules an order in which the determined one or more data processing components deployed for the business organization process the received customer data, and further monitors the data processing functions performed by the determined one or more data processing components to ensure the order.

4. A computer system comprising:
   at least one processor for:
   storing, by an application server of the computer system, a plurality of separable and preconfigured data processing components that are each executable to perform a particular data processing function on a particular type of data to carry out a specific business function, role or task;
   making, by the application server, the data processing components available to a plurality of different business organizations;
   receiving, by the computer system from each of the business organizations, a selection of a subset of the data processing components to deploy;
   deploying, through the application server of the computer system for each of the business organizations, the selected subset of the data processing components, including:
   (a) receiving, from a client, customer data via a plurality of interfaces of the computer system including an automated computer telephony interface (CTI), an interactive voice response system, a graphical user interface (GUI), and an e-mail system;
   (b) determining, by the computer system, one or more of the deployed data processing components that is executable to perform a particular data processing function on a type of the received customer data;
   (c) organizing, in a database of the computer system, the received customer data according to the determined one or more data processing components, including associating, in the database of the computer system, the received customer data with the determined one or more data processing components;
   (d) based on the association in the database, executing, through the application server of the computer system, the determined one or more data processing components on the received customer data including performing the data processing functions of the determined one or more data processing components on the received customer data; and (e) providing, to the client by the application server of the computer system, a result of performing the data processing functions on the received customer data.

5. A non-transitory machine readable storage medium comprising processor executable instructions that when executed by a central processing unit perform a method comprising:

storing, by an application server of a computer system, a plurality of separable and preconfigured data processing components that are each executable to perform a particular data processing function on a particular type of data to carry out a specific business function, role or task;

making, by the application server, the data processing components available to a plurality of different business organizations;

receiving, by the computer system from each of the business organizations, a selection of a subset of the data processing components to deploy;

deploying, through the application server of the computer system for each of the business organizations, the selected subset of the data processing components, including:

(a) receiving, from a client, customer data via a plurality of interfaces of the computer system including an automated computer telephony interface (CTI), an interactive voice response system, a graphical user interface (GUI), and an e-mail system;

(b) determining, by the computer system, one or more of the deployed data processing components that is executable to perform a particular data processing function on a type of the received customer data;

(c) organizing, in a database of the computer system, the received customer data according to the determined one or more data processing components, including associating, in the database of the computer system, the received customer data with the determined one or more data processing components;

(d) based on the association in the database, executing, through the application server of the computer system, the determined one or more data processing components on the received customer data including performing the data processing functions of the determined one or more data processing components on the received customer data; and (e) providing, to the client by the application server of the computer system, a result of performing the data processing functions on the received customer data.

* * * * *